(12) United States Patent
Mang

(10) Patent No.: US 7,905,160 B2
(45) Date of Patent: Mar. 15, 2011

(54) PROTECTIVE COVER

(75) Inventor: Wolf M. Mang, Obertshausen (DE)

(73) Assignee: Arno Arnold GmbH, Obertshausen (DE)

( * ) Notice: Subject to any disclaimer, the term of this patent is extended or adjusted under 35 U.S.C. 154(b) by 673 days.

(21) Appl. No.: 11/521,220

(22) Filed: Sep. 13, 2006

(65) Prior Publication Data

US 2007/0137961 A1    Jun. 21, 2007

(30) Foreign Application Priority Data

Sep. 14, 2005    (DE) ..................... 20 2005 014 596 U

(51) Int. Cl.
*F16J 3/04*    (2006.01)
(52) U.S. Cl. .......................................... 74/608; 160/223
(58) Field of Classification Search ............ 74/608–609, 74/612–617; 409/134; 451/451; *F16J 3/04*
See application file for complete search history.

(56) References Cited

U.S. PATENT DOCUMENTS

| 5,009,843 | A  | * | 4/1991  | Sugimoto et al. | ............. 420/112 |
| 6,167,737 | B1 | * | 1/2001  | Lyons et al.    | .................... 72/133 |
| 6,668,901 | B2 | * | 12/2003 | Tabellini       | ...................... 160/223 |

FOREIGN PATENT DOCUMENTS

| DE | 201 07 092 U 1     | 9/2001  |
| DE | 202 07 343 U 1     | 10/2002 |
| DE | 202 20 812 U 1     | 5/2004  |
| DE | 103 08 024 A1      | 9/2004  |
| DE | 10 2005 031 539 A1 | 1/2007  |

OTHER PUBLICATIONS

Guillaume Amontons—Wikipedia, the free encyclopedia, printed May 5, 2010, 5 pages.
Introduction to Tribology—Friction, printed May 5, 2010, 6 pages.
German Search Report for counterpart German Patent Application DE202005014596.3, dated Apr. 10, 2007, 2 pages.
European Search Report for counterpart European Patent Application EP06019139, dated Dec. 8, 2006, 6 pages.

* cited by examiner

*Primary Examiner* — Richard W Ridley
*Assistant Examiner* — Thomas Diaz
(74) *Attorney, Agent, or Firm* — Blakely, Sokoloff, Taylor & Zafman LLP.

(57) ABSTRACT

The invention relates to a protective cover comprising at least two protective-cover elements arranged one after the other in the direction of movement of the protective cover, each comprising at least one frame element (22, 22') which is provided with at least two frame sections (23, 24) which are offset with respect to one another, wherein at least one lamella element (1, 20) is arranged on each frame section in such a manner that the lamella elements slidingly overlap frame elements (22') arranged directly one after the other in a telescopic manner to form a substantially closed cover and wherein each frame section of each frame element is provided with a separate lamella element, whereas respectively one first lamella element (1) on a first frame section (23) comprises a tab (5) which overlaps the offset region to the second frame section (24) of the same frame element (22), wherein the tab grips behind a second lamella element (20) on the second frame section in such a manner that the tab of the first lamella element can be moved relative to the second lamella element during the movement of the protective cover.

12 Claims, 5 Drawing Sheets

PROTECTIVE COVER

CROSS-REFERENCE TO RELATED APPLICATIONS

The present patent application claims priority from German Utility Model Application No. 20 2005 014 596.3 filed on Sep. 14, 2005.

BACKGROUND OF THE INVENTION

1). Field of the Invention

The invention relates to a protective cover comprising at least two protective-cover elements arranged one after the other in the direction of movement of the protective cover according to the preamble of claim 1.

2). Discussion of Related Art

Protective covers of the type in question are used in particular, but in no way exclusively, for covering movable machine parts or the like.

It is known to provide a bellows for covering movable machine parts of this type. In order to prevent the bellows from being disturbed, for example, by particles such as metal swarf or the like, such as occurs during the machining of metals, plastic, or wood, it is likewise known to cover the bellows by metal lamellas in the endangered area, respectively one metal lamella being arranged on the supporting frame of the bellows in such a manner that the lamellas of neighboring supporting frames overlap in such a manner that during the intended movement of the bellows, the respectively adjacent lamellas slide toward one another in a telescopic manner to form a substantially closed cover.

In particular when the protective cover has an L- or U-shaped or box-like closed cross-section and therefore offset supporting frame and likewise offset lamellas, a package-like arrangement of a plurality of lamellas stacked one above the other is obtained, particularly during extensive compression of the bellows. This has the consequence that as a result of the spatial movement of the metal lamellas, stresses are induced from the area of the offset into the linear regions to the left and right of the offset, which cause sticking of the lamellas and therefore hinder the movement of the bellows or the protective cover as a whole.

In order to reduce this problem, it is known, for example, from DE 201 07 092 U1 to construct the metal lamellas in three parts, namely with respectively one lamella section on both sides of the offset and a third additional lamella section in the area of the offset which is rigidly connected to the supporting frame of the fan-fold screen and grips behind the respectively adjacent lamellas with two offset tabs arranged in the manner of wings. The movements of the lamella sections are certainly decoupled in this way but as a result of the plurality of lamella elements to be produced and mounted, the expenditure on assembly and production is considerable. In addition, no rounded offset regions can be achieved in this design.

SUMMARY OF THE INVENTION

Starting from this prior art, it is the object of the present invention to provide a protective cover which can be produced and assembled simply and cost-effectively while providing a secure cover and which allows unhindered sliding together of the protective cover without the risk of sticking, with a substantially free design of the offset region.

This object is achieved by a protective cover according to the teaching of claim 1.

Advantageous embodiments of the invention are the subject matter of the dependent claims.

The protective cover according to the invention comprises in an initially known fashion at least two protective cover elements arranged one after the other in the direction of movement of the protective cover, each comprising at least one frame element which is provided with at least two frame sections which are offset with respect to one another. In this case, at least one lamella element is arranged on each frame section in such a manner that the lamella elements slidingly overlap frame elements arranged directly one after the other in a telescopic manner to form a substantially closed cover. Each frame section of each frame element is provided with a separate lamella element.

According to the invention, respectively one first lamella element on a first frame section comprises a tab which overlaps the offset region to the second frame section of the same frame element. In this case, the tab grips behind a second lamella element on the second frame section in such a manner that the tab of the first lamella element can be moved relative to the second lamella element during the movement of the protective cover.

In other words, the essential idea of the present invention is to arrange a lamella element, namely the second lamella element, substantially firmly on its frame section while the first lamella element is likewise arranged firmly on the first frame section in the area of its one end but its free end engages in the area of the second lamella element and its freely movable therewith respect to this element. A degree of freedom in the movement between the two lamella elements is thereby produced which prevents the buildup of undesirable stresses or at least significantly reduces these.

According to a preferred exemplary embodiment of the invention, the frame elements are supporting frames of a bellows between which the folded regions of the bellows are disposed. In this exemplary embodiment, the protective cover according to the invention thus consists of a combination of a conventional bellows with a lamella cover which substantially serves to protect the bellows.

The bellows preferably forms a substantially closed bellows body. In this case, closed does not mean a profile having a closed box-like cross-section but rather a closed, that is substantially impermeable, design of the bellows.

According to a further embodiment, the bellows is provided with recesses and/or openings at least in parts. The bellows can thus be provided with single or multiple slits over its entire length and thus be divided into separate bellows elements.

In this case, the bellows element is no longer used primarily for sealing but for connecting the frame elements.

According to a further particularly preferred exemplary embodiment, the frame elements are interconnected by at least tensile-force-transmitting connecting elements, in particular straps, spring elements or similar. This design is based on the finding that if the lamella elements have a sufficient sealing or protective action, a bellows can be completely dispensed with but to ensure an intended movement of the protective cover, the frame elements and therefore the protective cover elements must be connected at least in a tensile-force-transmitting manner.

The material of the lamella elements is in principle arbitrary. Preferably however, the first and/or the second lamella element consists of plastic or metal, in particular of spring steel. In this case, on the one hand, a cover secure against disturbance is achieved and on the other hand, as a result of the elastic properties of the lamella material, both a spring-elastic pressure of the lamella elements which slide on one another and therefore a high sealing effect is achieved, and also a high reliable elastic deformation in the area of the offset is achieved.

In order to improve the sealing effect of the protective cover in particular, according to a further exemplary embodiment, the lamella elements comprise a sliding lip which is at least slightly offset from the lamella plane at least in sections in the area of the edge respectively abutting against the adjacent lamella element so that it overlaps said element.

In order to ensure a sufficient sealing effect between two consecutively arranged adjacent lamella elements in the event of an intended or unintended elastic deformation of the metal lamellas, according to one exemplary embodiment, the edge which overlaps the respectively adjacent lamella element and which substantially abuts against this element is provided with a plurality of slits which are open toward the edge and run substantially transversely to the edge. In this case, the slits in the edge of the tab of the first lamella element are preferably arranged at least in the area of the offset region.

According to a further particularly preferred exemplary embodiment, the edges of the lamella elements opposite to the edges which come slidingly to rest on the neighboring lamella elements are provided, at least in parts, with offset tabs, in particular in the form of bent sections, which overlap the allocated edges of the frame sections. The tabs can be arranged and embodied as singular tabs or groups of tabs. However, it is likewise also feasible that substantially the entire edge is offset or bent and forms a single tab. In this case, the tabs substantially serve to abut and fix the lamella elements on the allocated frame sections.

In a manner known per se, the offset tabs can be provided with recesses for penetration of at least one fixing element, in particular in the form of a spring clip, with which the lamella elements can be fixed on the relevant frame sections.

In order to allow, in particular, easy deformation or offsetting of the tab in the area of the offset between the two frame sections, the edges of the first lamella element have no offset tabs in the area of the tabs which overlap the offset region.

According to a further exemplary embodiment of the invention, the area of the edge of the tab of the first lamella element which grips behind the second lamella element is provided, at least in parts, with an offset tab which overlaps the relevant edge of the second frame section. This means that the first lamella element which is fixed to the first frame section in the manner of a fixed bearing, is mounted with its free end, namely the tab which overlaps the offset region, on the second frame section but resting there in the manner of a loose bearing which allows movement of the tab on the second frame element in the longitudinal direction of the second frame element.

BRIEF DESCRIPTION OF THE DRAWINGS

The invention is explained in detail hereinafter with reference to drawings which show merely one exemplary embodiment. In the figures.

DETAILED DESCRIPTION OF THE INVENTION

Figure 1:
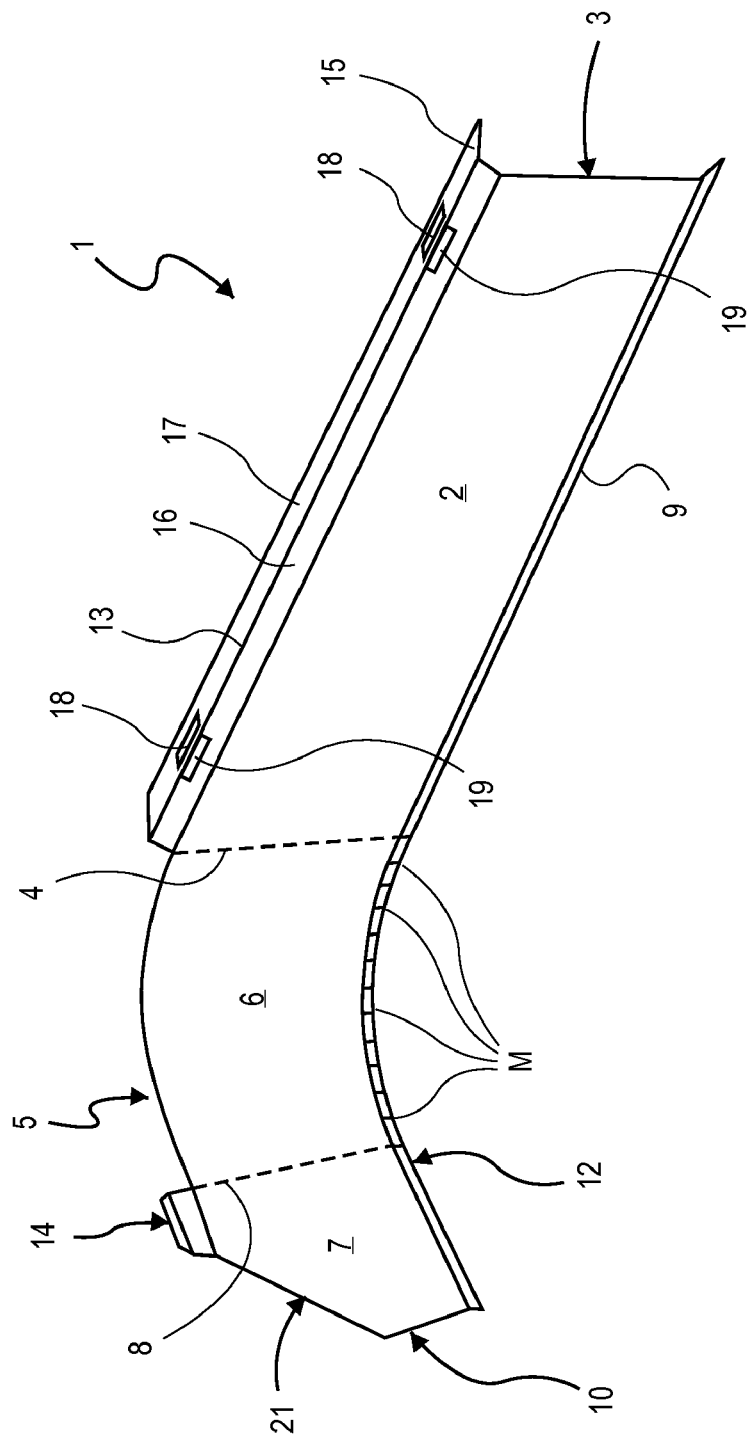
FIG. 1 is an exemplary embodiment of a first lamella element according to the protective cover of the present invention in a perspective schematic view.

The first lamella element 1 shown in FIG. 1 substantially consists of a flat sheet-metal blank made of spring steel. The lamella element comprises a first region 2 which is embodied as a straight section. This region extends substantially from the front edge 3 of the lamella element as far as the dashed line 4. A tab 5 is formed in one piece on this first region. The tab comprises a curve-shaped bent region 6 and a substantially straight or flat region 7. In this case, the curve-shaped bent region extends substantially from the dashed line 4 to the dashed line 8.

At its lower edge, the lamella element 1 has a region which is bent backward from the sheet-metal plane in the form of a sliding lip 9. This sliding lip 9 extends over the entire length of the lamella element 1 from the front edge 3 to the front edge 10. In the curve-shaped bent region 6, the sliding lip 9 is provided with a plurality of slits 11 which are open toward the edge 12, which improve the deformability or flexibility of the region 6.

In the area of its edge 13 opposite to the edge 12, the lamella element 1 is provided with offset tabs 14 or 15 which, in the exemplary embodiment shown, are formed by bent sections of the sheet-metal blank of the lamella element. The cross-section of the tabs 14 and 15 has the same substantially triangular profile and these tabs are formed by a first bent section 16 and a second bent section 17. The curve-shaped bent region 6 has no offset tab in order not to impede the intended bending to cover the offset region of the protective cover.

The tab 15 of the first region 2 has recesses 18 and 19 which are intended for penetration of a spring clip, which is not shown, for fixing to the allocated frame section. The tab 14 of the region 7, on the other hand, has no such recesses.

The front edge 10 of the region 7 has a slope 21.

Figure 2:
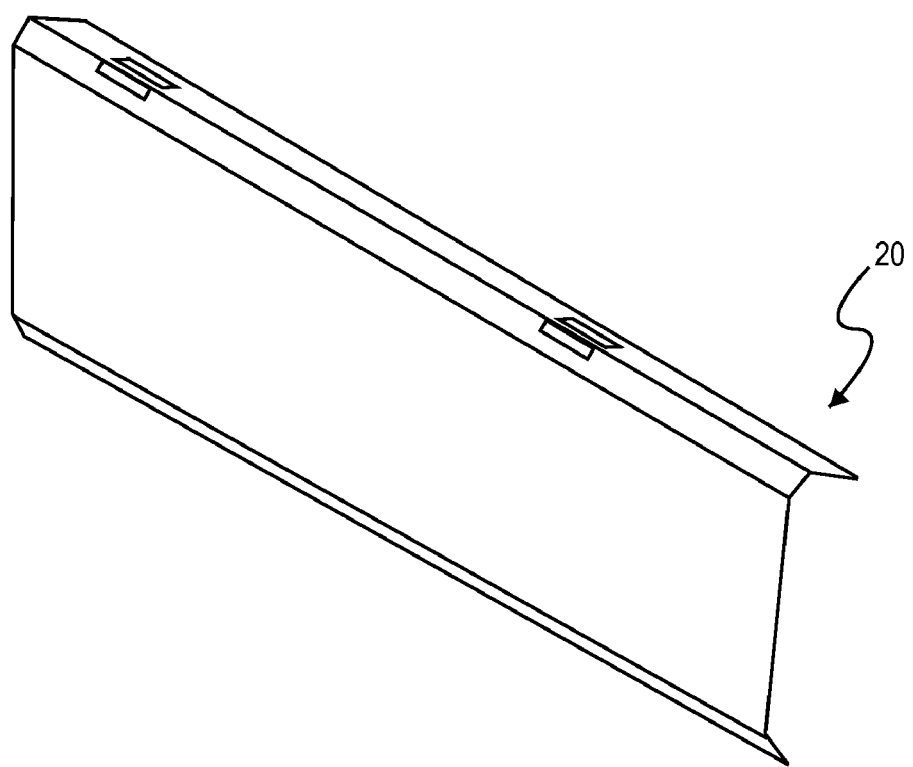
FIG. 2 is an exemplary embodiment of a second lamella element according to the protective cover of the present invention in a view corresponding to that of FIG. 1.

The second lamella element 20 shown in FIG. 2 has basically the same structure as the first region 2 of the first lamella element 1. In particular, the bent sections and offset tabs correspond in form, geometry, and arrangement to the corresponding sizes of the first lamella element 1.

Figure 3:
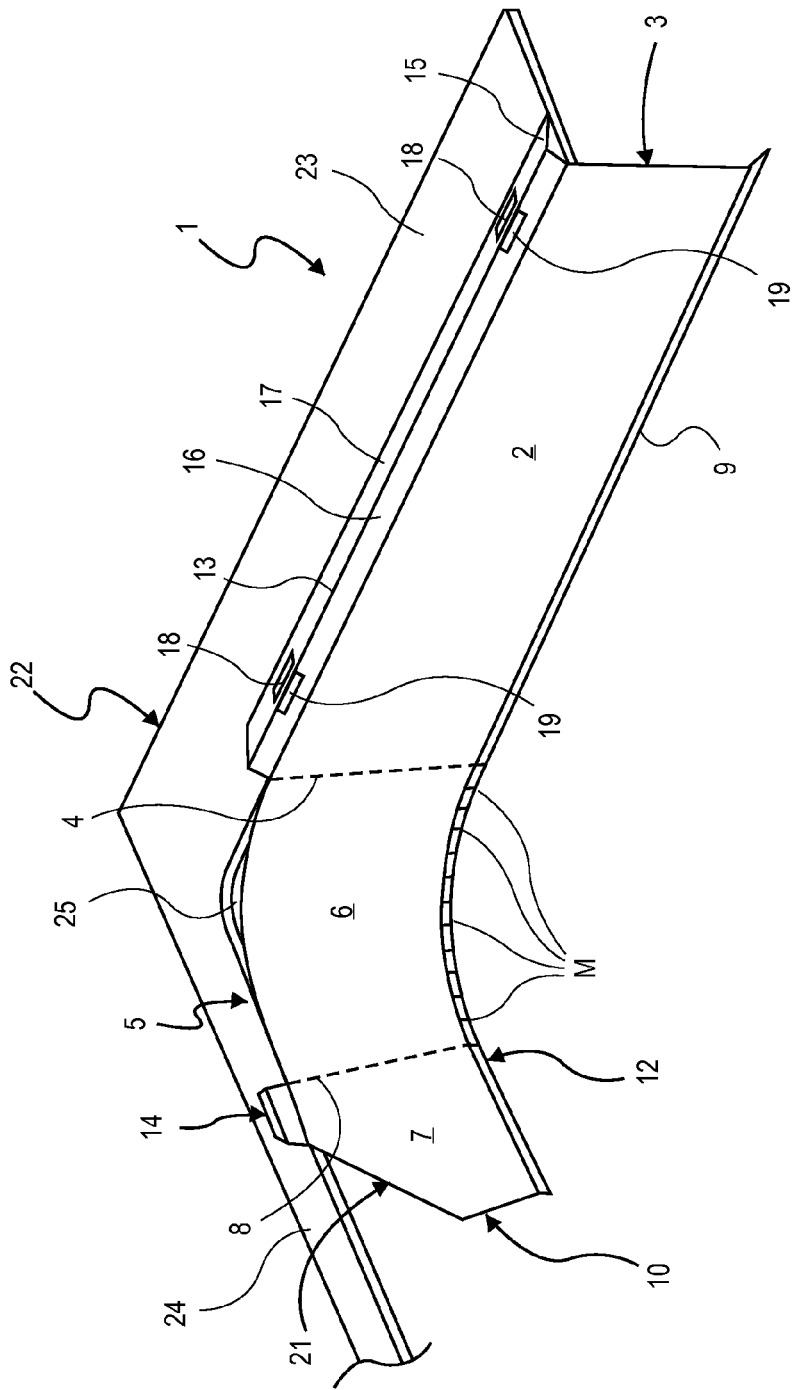
FIG. 3 shows the first lamella element in its arrangement on the allocated frame element in a view corresponding to FIG. 1.

FIG. 3 shows the first lamella element in its arrangement on a frame element 22. The frame element 22 comprises two frame sections 23 and 24, the two frame sections in this exemplary embodiment being offset by an angle of about 90 degrees with respect to one another. As can be further seen from this diagram, the lamella element is arranged substantially fixedly on the frame element 23 by means of spring clips which are not shown and which penetrate through the recesses 18 and 19, that is immovably in the longitudinal direction of the region 2. The curved region 6 covers the region of the bent section 25 of the frame element 22, the straight region 7 coming to rest with its offset tab 14 on the frame section 24. In contrast to the fixing on the frame section 23, the arrangement is not fixed however but can be displaced in the manner of a loose bearing, at least in the longitudinal direction of the frame section 24. This means that during deformation of the curved bent region 6, the straight region 7 can move substantially freely with respect to the frame section 24.

Figure 4:
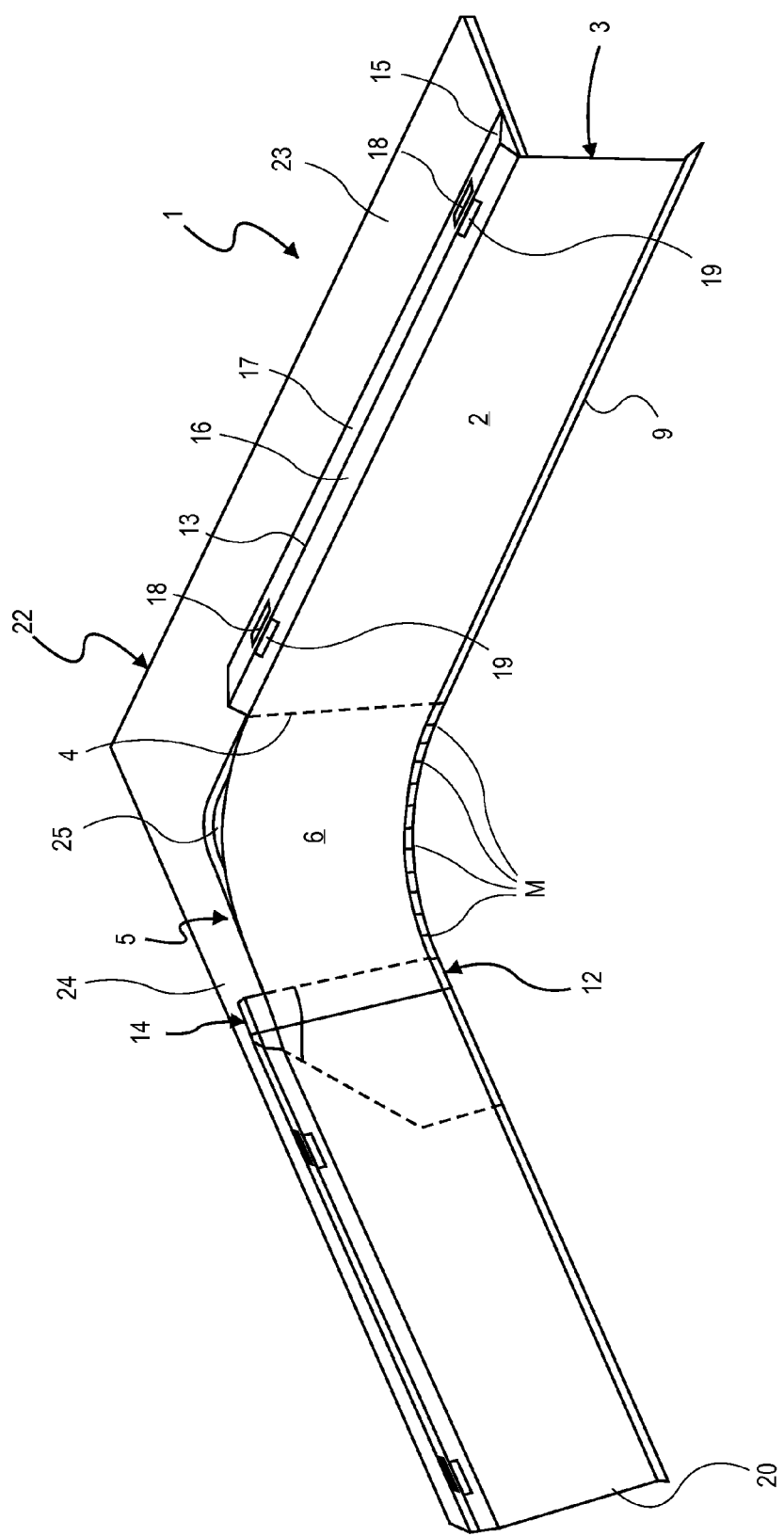
FIG. 4 shows the arrangement of the two lamella elements on the allocated frame element in a view corresponding to FIG. 3.

As can be seen in particular from FIG. 4, the second lamella element 20 is arranged on the frame section 24 of the frame element 22 and is affixed there in the same way as the lamella element 1 on the frame element 23 by means of spring clips which are not shown. The tab 5 of the first lamella element grips behind the second lamella element 20 with its tongue-like region 7, thereby covering the entire frame region, in particular in the area of the bent section 25.

Figure 5:
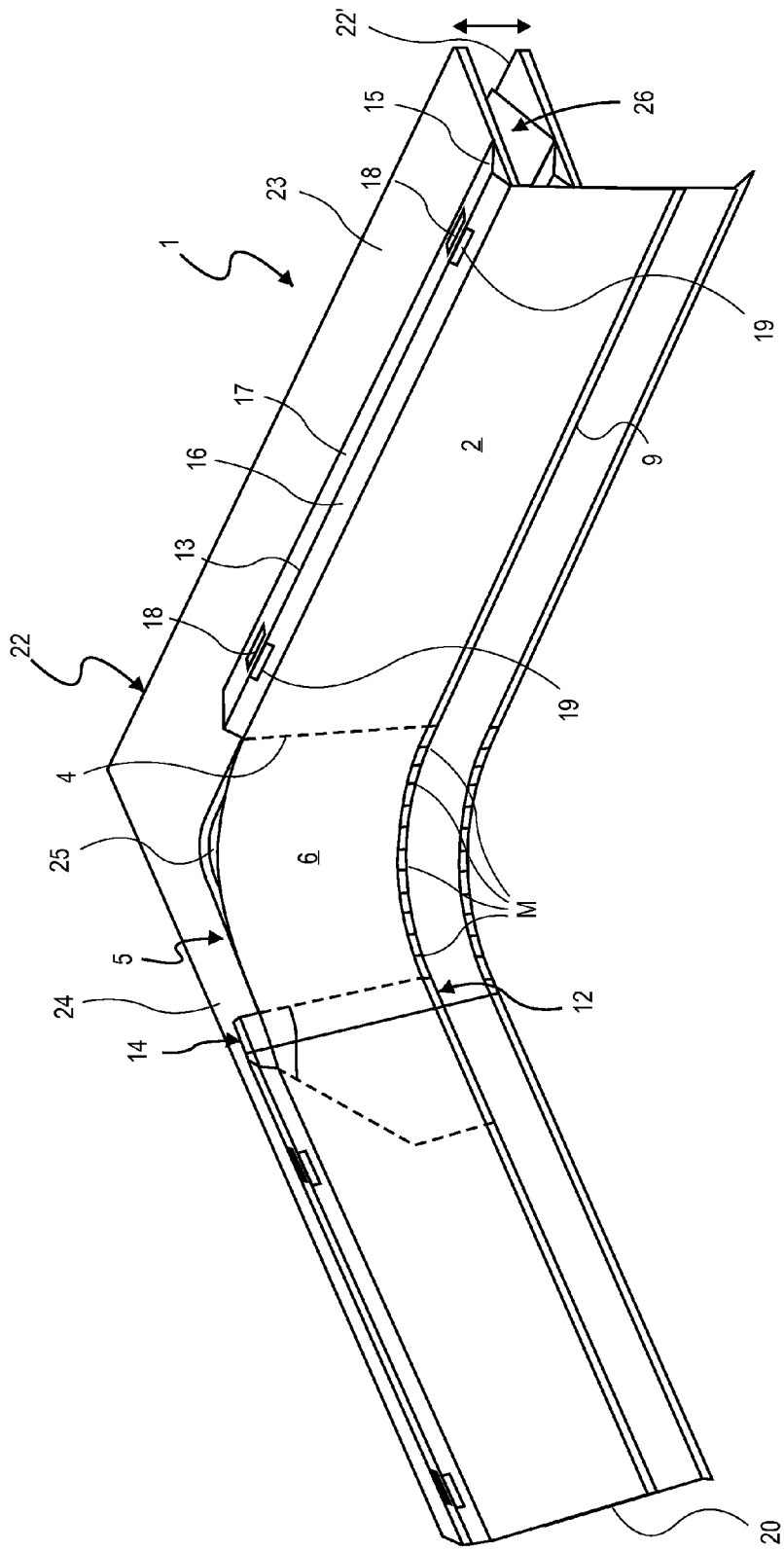
FIG. 5 is a schematic diagram showing two consecutively arranged protective cover elements according to the preceding figures.

FIG. 5 shows two substantially identical protective cover elements according to the present invention, which overlap one another in a telescopic manner, the protective cover according to the invention being formed by a plurality of protective cover elements arranged one after the other in such a manner. Each of the two protective cover elements has a separate frame element 22 or 22'. In the exemplary embodiment shown here, the two frame elements are supporting frames of a bellows 26 which is merely shown schematically. The bellows 26 has bellows sections which are arranged between the frame elements 22 and 22' and connect these in a tensile-force-transmitting manner.

When the bellows is expanded, the protective cover elements are expanded, respectively the first and second lamella elements sliding on one another. In the same way, when the protective cover is compressed, the respective lamella elements again execute a sliding movement one upon the other, where a plurality of successively arranged lamella elements are pushed over one another in a telescopic manner to form a lamella package. The deformation of the lamella sections in this region which would result in sticking of the protective cover according to the prior art, is compensated or taken up according to the invention by the free mobility of the tab of the first lamella element both with respect to the frame and also to the second lamella element. As a result, sticking can be eliminated or at least significantly reduced.

What is claimed:

1. A protective cover comprising:
   at least two protective-cover elements arranged one after the other in the direction of movement of the protective cover, each protective-cover element including
      at least one frame element, which is provided with at least two frame sections that are offset with respect to one another, and
      at least one lamella element coupled to each frame section,
   wherein the lamella elements of the frame elements are arranged directly one after the other, overlapping and sliding over one another in a telescopic manner to form a substantially closed cover, and
   wherein each frame section of each frame element is provided with a separate lamella element, wherein a first lamella element on a first frame section includes a tab, wherein the tab includes a curved portion and a flat portion, wherein the curved portion overlaps an offset region between a first frame section and a second frame section and the flat portion extends to a flat, second frame section of the same frame element, wherein the flat portion of the tab engages behind a second lamella element on the second frame section such that the tab of the first lamella element can be moved relative to the second lamella element during the movement of the protective cover, and wherein the second lamella element does not include a tab with a curved portion.

2. The protective cover according to claim 1, wherein the frame elements are supporting frames of a bellows between which the folded regions of the bellows are disposed.

3. The protective cover according to claim 2, wherein the bellows forms a substantially closed bellows body.

4. The protective cover according to claim 1, wherein the frame elements are interconnected by tensile-force-transmitting connecting elements.

5. The protective cover according to claim 1, wherein the first or the second lamella element consists of plastic or metal.

6. The protective cover according to claim 1, wherein each of the lamella elements includes a sliding lip which is at least slightly offset from a lamella plane at least in sections in the area of an edge respectively abutting against the adjacent lamella element so that it overlaps said adjacent lamella element.

7. The protective cover according to claim 1, wherein an edge of a region of the first lamella element includes a plurality of slits which run substantially transversely to the edge.

8. The protective cover according to claim 7, wherein the slits in the edge of the first lamella element are arranged at least in a curved area of the offset region.

9. The protective cover according to claim 1, wherein an edge of the first lamella element includes offset tabs, which overlap corresponding edges of the frame sections.

10. The protective cover according to claim 9, wherein the offset tabs are provided with recesses for penetration of at least one fixing element, with which the first lamella element can be fixed on a corresponding frame section.

11. The protective cover according to claim 9, wherein the edge of the first lamella element has no offset tabs in an area that overlaps the offset region.

12. The protective cover according to claim 9, wherein an area of the first lamella element which engages behind the second lamella element includes an offset tab which overlaps a corresponding edge of the second frame section.

* * * * *